(12) United States Patent
Deng et al.

(10) Patent No.: US 9,798,885 B2
(45) Date of Patent: *Oct. 24, 2017

(54) SECURITY POLICY GENERATION BASED ON SNAPSHOTS OF SIMILAR VIRTUAL MACHINES

(71) Applicant: International Business Machines Corporation, Armonk, NY (US)

(72) Inventors: Yu Deng, Yorktown Heights, NY (US); Ruchi Mahindru, Elmsford, NY (US); HariGovind V. Ramasamy, Ossining, NY (US); Lakshminarayanan Renganarayana, San Jose, CA (US); Soumitra Sarkar, Cary, NC (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,009

(22) Filed: Dec. 20, 2016

(65) Prior Publication Data
US 2017/0103212 A1    Apr. 13, 2017

Related U.S. Application Data

(63) Continuation of application No. 14/699,251, filed on Apr. 29, 2015, now Pat. No. 9,563,777.

(51) Int. Cl.
G06F 11/00        (2006.01)
G06F 21/57        (2013.01)
(Continued)

(52) U.S. Cl.
CPC ............ G06F 21/577 (2013.01); G06F 3/065 (2013.01); G06F 3/0619 (2013.01);
(Continued)

(58) Field of Classification Search
USPC ...................................... 726/22–25; 713/188
See application file for complete search history.

(56) References Cited

U.S. PATENT DOCUMENTS 6,859,893 B2    2/2005    Hines
7,409,719 B2    8/2008    Armstrong et al.
(Continued)

OTHER PUBLICATIONS

Ammons et al., "Virtual machine images as structured data: the Mirage image library", IBM Research, HotCloud'11 Proceedings of the 3rd USENIX conference on Hot topics in cloud computing, pp. 1-6.
(Continued)

*Primary Examiner* — Amare F Tabor
(74) *Attorney, Agent, or Firm* — David B. Woycechowsky; Andrew Aubert

(57) ABSTRACT

Determining which snapshot deltas tend to occur in: (i) healthy virtual machines (VMs) that have been subject to an attack yet remained healthy, and/or (ii) unhealthy VMs that have apparently been adversely affected by an attack. Snapshot deltas that occur in at least some (or more preferably all) of the healthy VM subset provide information about software changes (for example, updates, configuration changes) that may be helpful. Snapshot deltas that occur in at least some (or more preferably all) of the unhealthy VM subsets provide information about software changes (for example, updates, configuration changes) that may be unhelpful.

10 Claims, 9 Drawing Sheets

(51) Int. Cl.
*G06F 9/455* (2006.01)
*G06F 3/06* (2006.01)

(52) U.S. Cl.
CPC ........ *G06F 3/0685* (2013.01); *G06F 9/45558* (2013.01); *G06F 2009/45562* (2013.01); *G06F 2009/45587* (2013.01)

(56) References Cited

U.S. PATENT DOCUMENTS

| | | | |
|---|---|---|---|
| 7,640,591 B1* | 12/2009 | Tripathi | H04L 63/1416 |
| | | | 726/22 |
| 8,055,937 B2* | 11/2011 | Goroff | G06F 11/1451 |
| | | | 714/6.13 |
| 8,069,471 B2* | 11/2011 | Boren | H04L 63/1433 |
| | | | 713/150 |
| 8,099,628 B2 | 1/2012 | Simeoni | |
| 8,140,905 B2 | 3/2012 | Beaty et al. | |
| 8,140,907 B2 | 3/2012 | Beaty et al. | |
| 8,195,980 B2 | 6/2012 | Schuba et al. | |
| 8,225,314 B2* | 7/2012 | Martins | G06F 8/63 |
| | | | 718/1 |
| 8,452,756 B2 | 5/2013 | Anderson et al. | |
| 8,538,919 B1 | 9/2013 | Nielsen et al. | |
| 8,726,273 B2* | 5/2014 | Le | G06F 9/5077 |
| | | | 718/1 |
| 8,856,078 B2* | 10/2014 | Knowles | G06F 9/45558 |
| | | | 707/649 |
| 8,904,531 B1* | 12/2014 | Saklikar | H04L 63/1416 |
| | | | 707/695 |
| 8,949,585 B2 | 2/2015 | Hiltgen et al. | |
| 9,507,623 B2* | 11/2016 | Tarasuk-Levin | G06F 9/45558 |
| 2008/0195369 A1 | 8/2008 | Duyanovich et al. | |
| 2010/0058106 A1 | 3/2010 | Srinivasan et al. | |
| 2010/0100962 A1* | 4/2010 | Boren | H04L 63/1433 |
| | | | 726/25 |
| 2010/0180092 A1* | 7/2010 | Rajaa | G06F 17/30067 |
| | | | 711/162 |
| 2010/0251363 A1 | 9/2010 | Todorovic | |
| 2012/0216052 A1 | 8/2012 | Dunn | |
| 2013/0111473 A1 | 5/2013 | Ammons et al. | |
| 2013/0179736 A1 | 7/2013 | Gschwind et al. | |
| 2013/0339787 A1 | 12/2013 | Bala et al. | |
| 2014/0283051 A1* | 9/2014 | Doron | H04L 63/1458 |
| | | | 726/23 |
| 2015/0244717 A1* | 8/2015 | Jin | H04L 63/0853 |
| | | | 726/4 |
| 2015/0378636 A1* | 12/2015 | Yadav | G06F 3/0626 |
| | | | 711/165 |
| 2016/0124676 A1 | 5/2016 | Jain et al. | |
| 2016/0321455 A1 | 11/2016 | Deng et al. | |

OTHER PUBLICATIONS

Whitaker et al., "Using Time Travel to Diagnose Computer Problems", Proceedings of the 11th workshop on ACM SIGOPS European workshop (EW 11), Article No. 16, ACM New York, NY, USA © 2004, 6 pages.
List of IBM Patents or Patent Applications Treated as Related, Dec. 21, 2016, 2 pages.

* cited by examiner

SECURITY POLICY GENERATION BASED ON SNAPSHOTS OF SIMILAR VIRTUAL MACHINES

BACKGROUND OF THE INVENTION

The present invention relates generally to the field of security policy and/or stability of computer performance issues, and more particularly to security policy and/or stability of computer performance issues applicable to virtual machines.

It is known that changes to a computer system that includes virtual machines (VMs) can introduce operability problems to that computer system. One known technique for attempting to diagnose and/or remediate such problems is by the systematic capture of snapshots (for example, periodic capture of snapshots). In some variations on this known technique, a "partial capture" is used. More specifically, under the partial capture approach, a full VM snapshot is not used, but, rather, a capture of a subset of the information in a server is used, such as the list of all files (at some granularity of the file system), the list of all installed products running processes, open ports, and so on.

One known technique is called "difference computation." The known technique of "difference computation" can be described as follows: at any moment in time, the state of a server (a physical or virtual entity), measured along many dimensions, can be captured as a snapshot. One representation of the machine state in a snapshot can be recorded in terms of the files on the system, running processes, software packages installed and their configuration settings, configuration settings for various hardware components, the network settings allowing that machine to communicate with others, etc. A difference between any two snapshots of a machine is an important representation of state changes that have occurred on the machine between two points in time (when those snapshots were created). Calculation of such snapshot differences is performed using a difference computation process.

SUMMARY

According to an aspect of the present invention, there is a method, computer program product and/or system that performs the following steps (not necessarily in the following order): (a) monitoring a set of monitored virtual machines by (i) running the virtual machines to receive and process data, and (ii) intermittently taking snapshots of each virtual machine in the set of virtual machines; (b) for each virtual machine in the set of monitored virtual machines, determining a set of snapshot deltas, with each snapshot delta respectively corresponding to changes between pairs of temporally adjacent snapshots; (c) determining a first subset of virtual machines from the set of monitored virtual machines, where each virtual machine in the first subset of virtual machines meets the following conditions: (i) the virtual machine has been subject to an attack, and (ii) the virtual machine has not been adversely affected by the attack; (d) determining a second subset of virtual machines from the set of virtual machines, where each virtual machine in the second subset of virtual machines meets the following conditions: (i) the virtual machine has been subject to an attack, and (ii) the virtual machine has been adversely affected by the attack; and (e) analyzing the set(s) of snapshot deltas from the first subset of virtual machine(s) and/or the set(s) of snapshot deltas from the second subset of virtual machine(s) to determine at least one of the following: (i) unhealthy snapshot deltas that tend to occur in only virtual machines that are adversely affected by the attack, and/or (ii) healthy snapshot deltas that tend to occur only in machines that are subject to the attack but are not adversely affected by the attack.

DETAILED DESCRIPTION

Figure 1:
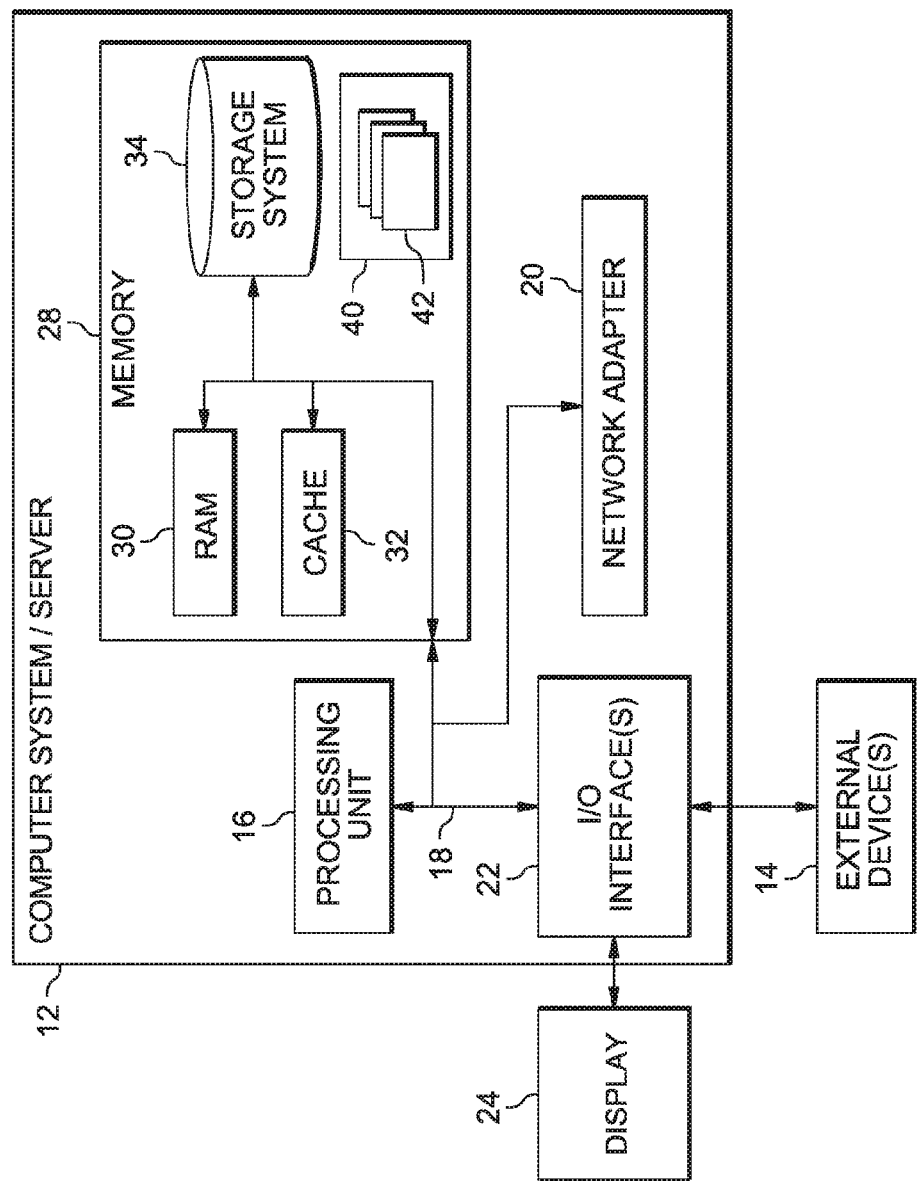
FIG. 1 depicts a cloud computing node according to an embodiment of the present invention.

Some embodiments of the present invention determine which snapshot deltas tend to occur in: (i) healthy virtual machines (VMs) that have been subject to an attack (see definition of "attack," below) yet remained healthy, and/or (ii) unhealthy VMs that have apparently been adversely affected by an attack. Snapshot deltas that occur in at least some (or more preferably all) of the healthy VM subsets, provide information about software changes (for example, updates, configuration changes) that may be helpful. Snapshot deltas that occur in at least some (or more preferably all) of the unhealthy VM subsets, provide information about software changes (for example, updates, configuration changes) that may not be helpful.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
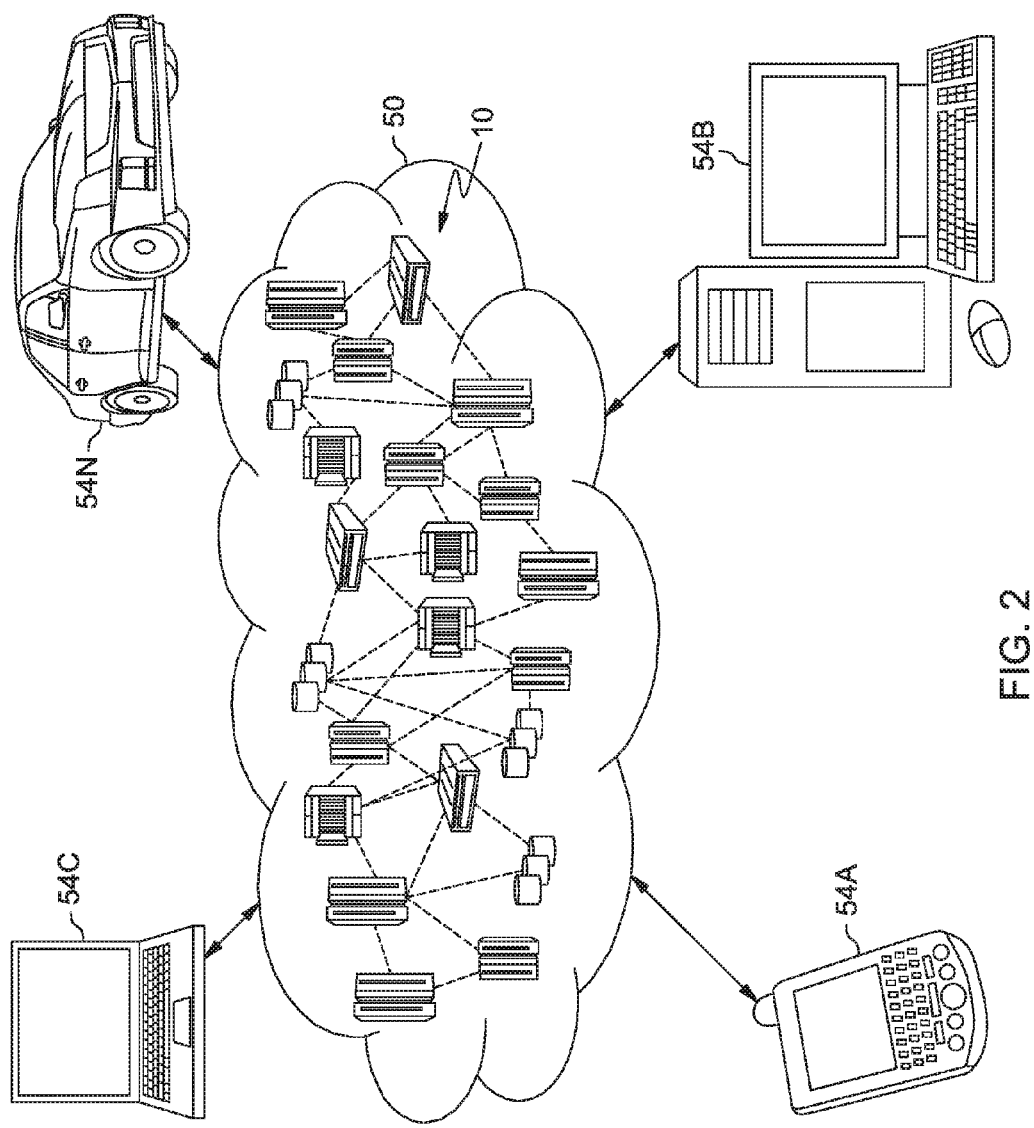
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
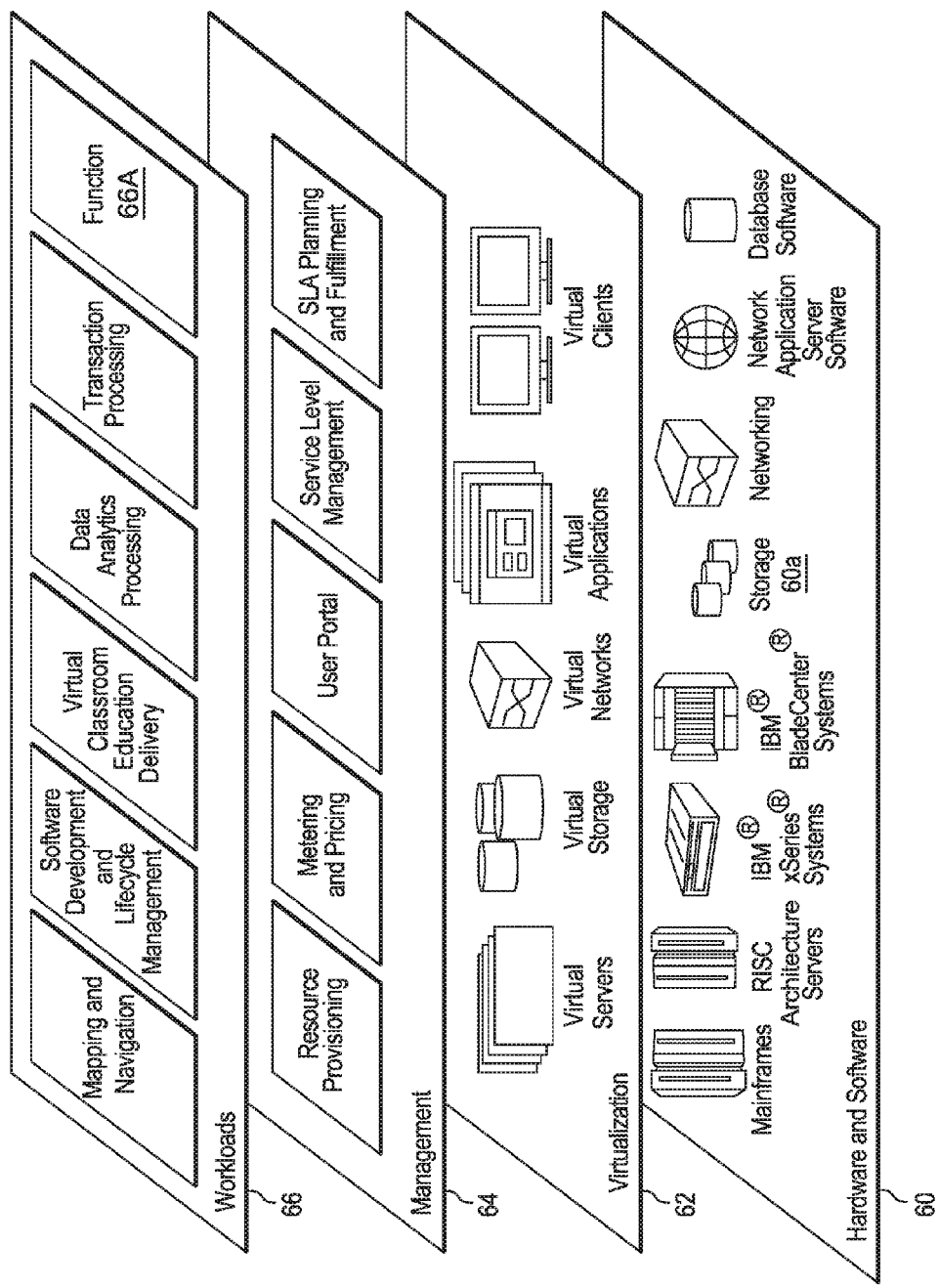
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the functionality to be described below in the Example Embodiment sub-section of this Detailed Description section.

II. EXAMPLE EMBODIMENT

Figure 4:
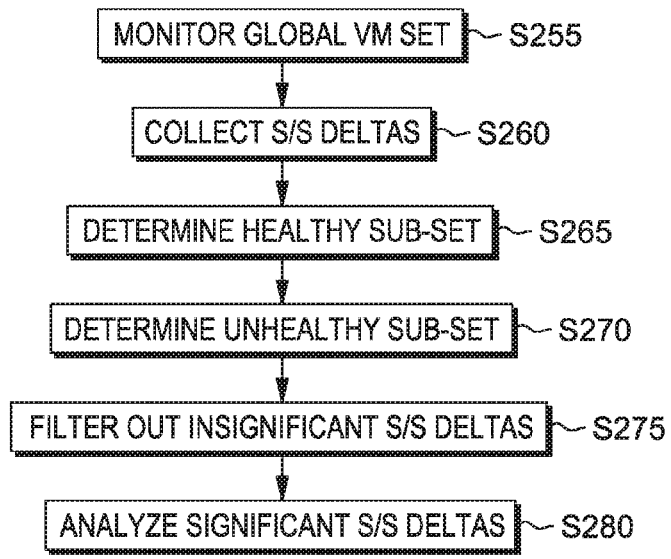
FIG. 4 is a flow chart showing a first embodiment of a method according to the present invention.
Figure 5:
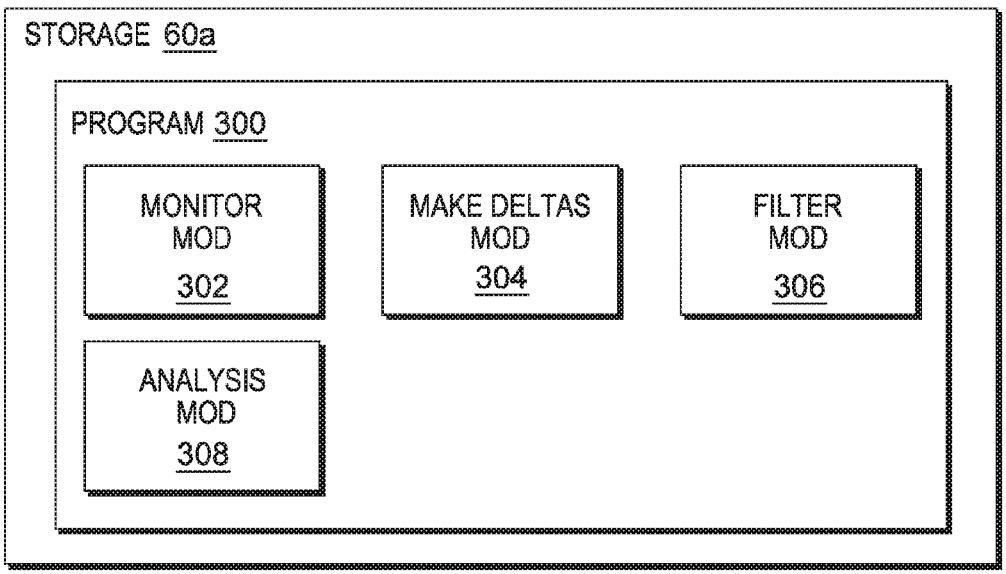
FIG. 5 is a block diagram showing a machine logic portion of the cloud computing environment of FIGS. 1 to 3.

FIG. 4 shows flowchart 250 depicting a fix-signature determination method according to the present invention. FIG. 5 shows program 300 (located in storage block 60a, see FIG. 3) for performing at least some of the method steps of flowchart 250. This method and associated software will now be discussed, over the course of the following paragraphs, with extensive reference to FIG. 4 (for the method step blocks) and FIG. 5 (for the software blocks). Processing begins at step S255, where monitor module ("mod") 302 monitors the VMs in a global set of VMs, which are the subject to the method of flowchart 250. More specifically, mod 302 collects all the snapshots from all the VMs, as well as information regarding attacks (see definition, below), workload spikes and VM health.

Processing proceeds to step S260, where make deltas mod 304 uses the snapshots, previously collected at step S255, to make deltas corresponding to all the snapshots. More specifically, the delta is data reflecting the changes between two successive snapshots for a given VM.

Processing proceeds to step S265, where monitor mod 302 determines a "healthy subset" of healthy VMs from the global set of VMs. As determined by their snapshots, deltas, and/or other collected data, these "healthy VMs" have been exposed to an attack (or workload spike), but have remained in good operating condition.

Processing proceeds to step S270, where monitor mod 302 determines an "unhealthy sub-set" of unhealthy VMs from the global set of VMs. As determined by their snapshots, deltas, and/or other collected data, these "unhealthy VMs" have been exposed to an attack (or workload spike), but have not remained in good operating condition.

Processing proceeds to step S275, where filter mod 306 filters, from the set of all deltas relating to the healthy and unhealthy sub-sets, those deltas that are not "significant delta sets" (see definition, below).

Processing proceeds to step S280, where analysis mod 308 analyzes the significant delta sets to determine: (i) unhealthy snapshot deltas that tend to occur in only virtual machines that are adversely affected by the attack (that is, the attack that caused the VM to be unhealthy), and/or (ii) healthy snapshot deltas that tend to occur only in machines that are subject to the attack (that is, the attack that rendered the unhealthy VMs as unhealthy) but are not adversely affected by the attack.

III. FURTHER COMMENTS AND/OR EMBODIMENTS

Some embodiments of the present invention recognize the following facts, potential problems and/or potential areas for improvement with respect to the current state of the art: (i) changes to a cloud system, including VMs, often have unforeseen side-effects; (ii) a security vulnerability may be introduced due to a code update; (iii) an "overload" vulnerability may be introduced due to a configuration change (for example, memory, thread pool size, etc.); (iv) the first time a new problem (for example, a security attack, system misbehavior due to a workload spikes (for example, a "tight loop")) occurs, the fix is not always obvious; (v) diagnosis and remediation of such problems requires expert reasoning across time and space; (vi) the time sequence of changes that occurred in the past to any single VM (that is, "VM history") typically matters for purposes of problem diagnosis and/or remediation; and/or (vii) the identity of changes that were made across the space of a group of related VMs (for example, at the product installation, configuration, upgrade, patch and other levels) typically also matters for purposes of problem diagnosis and/or remediation.

Some embodiments of the present invention may include one, or more, of the following features, characteristics and/or advantages: (i) problem diagnosis and/or remediation by machine logic (for example, software) that does not require: (a) human expert knowledge, and/or (b) substantial human intervention; (ii) a method to compare and analyze differences across time and space; (iii) leveraging of difference computations with additional analysis techniques; (iv) comparison of all differences across multiple different VMs (space) and within a single VM (time) in order to: (a) diagnose the root cause of a problem, and/or (b) identify the fix; (v) methods with automated problem diagnosis that employ human expert involvement for identification of the fix signature; (vi) use of "partial capture" techniques; and/or (vii) of difference computation techniques as described.

Figure 6:
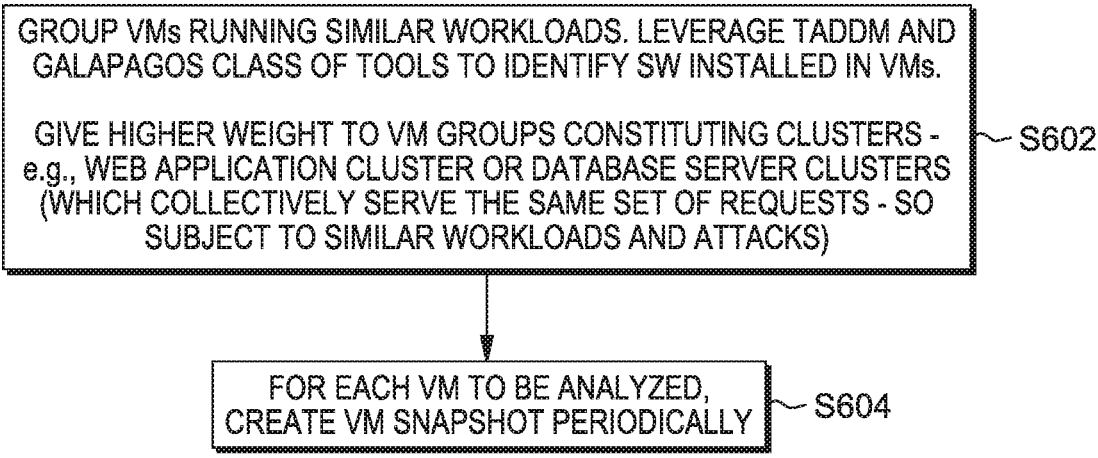
FIG. 6 is a flow chart showing a second embodiment of a method according to the present invention.

A fix signature determination process, according to an embodiment of the present invention, will now be discussed in connection with the following Figures: (i) FIG. 6 shows flow chart 600, which a method for pre-analysis preparation and steady state (that is, pre-detected-problem) operation; and (ii) FIG. 7 shows flow chart 700, which is a method for post-problem detection analysis.

At step S602 of flow chart 600, an embodiment of software according to the present invention: (i) groups VMs running similar workload into a set of groups; (ii) uses a conventional, and commercially available, application dependency discovery management program to identify software installed in each VM of each group of VMs; (iii) uses currently conventional software-based tools for discovering fine-grained static application dependencies; and (iv) gives greater weight to VM groups which correspond to predetermined "clusters" (for example, web application cluster, database server cluster). The "clusters" mentioned in item (iv) of the foregoing sentence, collectively serve a common set of requests, which typically makes the VMs within a cluster have similar configurations, and therefore be subject to similar workloads and/or similar attacks.

Processing proceeds to step S604 of flow chart 600, where the software intermittently creates a snapshot of each VM that may be subjected to the analyses described. In this embodiment, the snapshot represents an efficient capture of important state information of the VM. It is a full snapshot, but is not represented by the entire (byte level) content of all the persistent storage (disk(s)) of the VM, which is what typically storage-level snapshots mean in the Cloud or virtualization domain. Alternatively, it may be a partial snapshot. In this embodiment, the snapshot-taking is periodic (that is, it occurs at regular intervals of time). Alternatively, the snapshot-taking could occur at irregular times (for example, snapshot-taking triggered by events and/or operational status).

Figure 7:
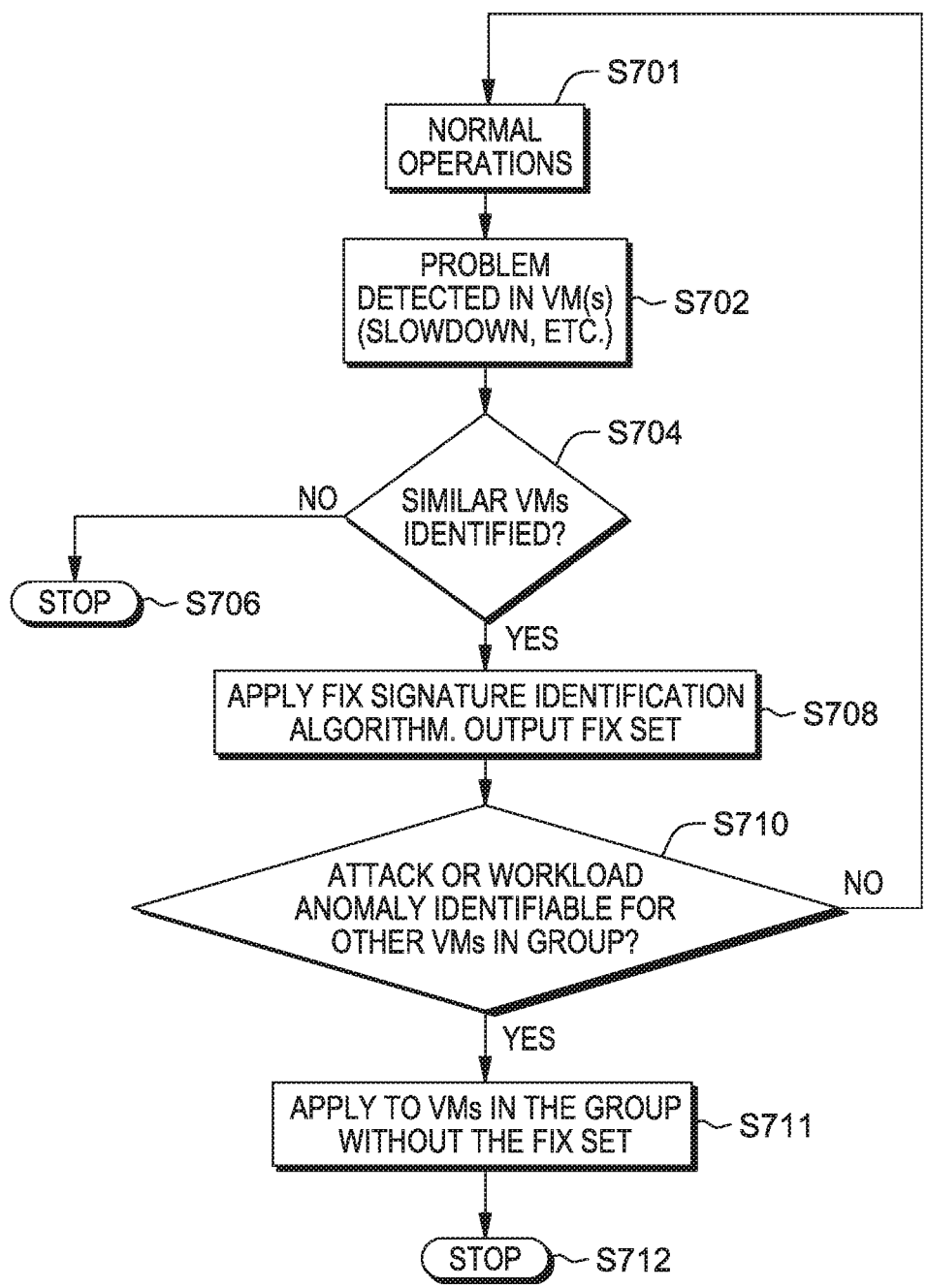
FIG. 7 is a flow chart showing a third embodiment of a method according to the present invention.

Moving along to flow chart 700 of FIG. 7, processing begins at step S701 where normal operations of a set of VMs continues to occur until, at step S702, the existence (but not the cause) of a problem is detected in the currently conventional way.

Processing proceeds to step S704 (and, conditionally, step S706), where the software determines whether there are similar VMs in the global set of VMs that are similar to the specific VM(s) that is, or are, experiencing the problem identified at step S702. More specifically, the similar VMs will be the ones in the same group and/or cluster as previous identified at step S602 of flow chart 600. This determination of similarity is one made across "space" because it considers other VMs, besides the VM experiencing the problem.

If it is determined that there are similar VMs then processing proceeds to step S708, where the software applies the fix signature identification algorithm, discussed below, and outputs a fix signature (discussed below) (on condition that an appropriate fix signature is found). The fix signature identification algorithm of this embodiment will be further discussed, below.

Processing proceeds to step S710, where it is determined whether an attack and/or workload anomaly can be identified for other VMs in the group previously identified at step S704. If nothing is identified, then processing loops back to normal operations of step S701. If an attack or anomaly is identified, then processing proceeds to a stop at step S711 where the fix signature (also referred to herein as "fix set") is applied to VMs identified at step S710 which do not have the fix set. Processing then proceeds to a stop point at step S712.

With further regard to flow chart 700: (i) the "yes" branch extending from step S710 represents a deterministic approach; (ii) the "no" branch extending from step S710 represents a probabilistic approach, where other VMs in the group display problem(s) before re-running the analysis by returning to step S702. To explain further, assume a start state as follows: (i) in the security cases, some VMs got attacked, a subset were affected (vulnerable) and the rest were not affected (secure); (ii) in the security cases, affected VMs exhibit poor performance, crashes, and so on; (iii) in workload fluctuation cases, some VMs received the unusual workload (request patterns), a subset were affected (vulnerable) and the rest were not (robust); (iv) in workload fluctuation cases, affected VMs exhibit loops, crashes, hangs, and so on.

Given the start state of the previous paragraph, under the deterministic approach there is an operating assumption that it has been determined (by methods now known or to be developed in the future) the identity of the sub-set of VMs that have been attacked (or experienced the workload fluctuation), and which VMs did not. Given the start state of the previous paragraph, under the probabilistic approach, it is not necessarily determined which VMs were attacked or faced workload fluctuation. Rather, under the probabilistic approach, there are operating assumptions about such events for a set of VMs based on their configuration (for example, all of them are running similar SW and are part of a cluster, so process similar requests). Under the probabilistic approach, such assumptions are probabilistic in nature. Also, the longer the software waits to perform the diagnostics, the probability of the assumption being correct becomes higher.

Figure 10:
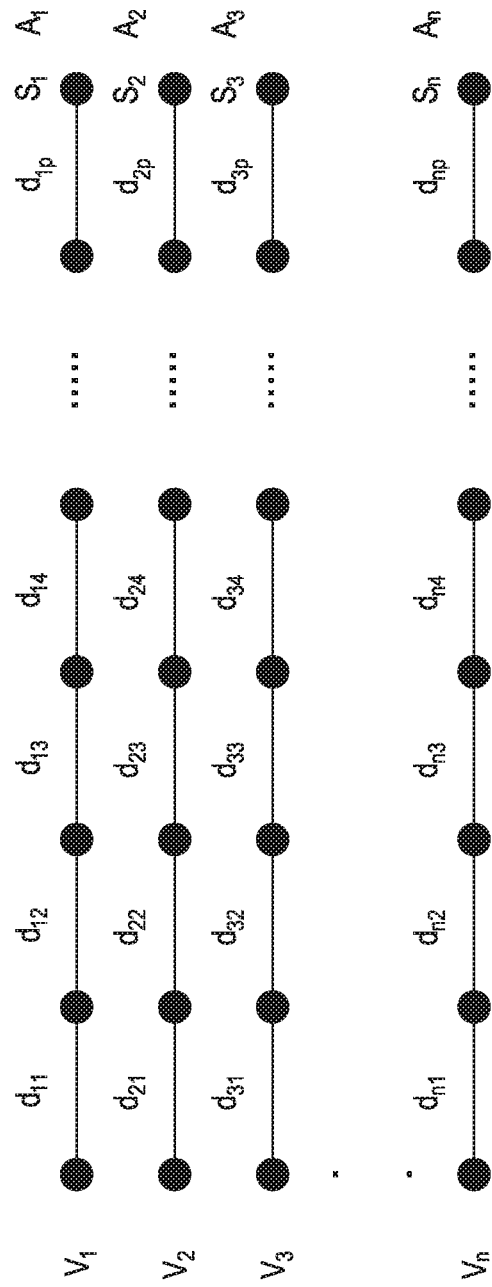
FIG. 10 is a diagram view showing information that is helpful for understanding embodiments of the present invention.

As shown in FIG. 10, diagram 1100 will now be used to further explain some terminology. The variables used in diagram 1100 are as follows: (i) V=VM; (ii) $d_{ik}$="meaningful" snapshot difference between snapshots k and k−1 of $VM_i$ (this maybe null); (iii) S=(binary) state: healthy or not-healthy; (iv) A=(binary)—attacked or not, or, faced workload spike or not. A goal is to find the minimum set of deltas that explain the healthy VMs. Assumptions are as follows: (i) $S_i$=0 (not healthy) or 1 (healthy) which is known from observation of $VM_i$; (ii) $V_h$={healthy VMs}, $V_u$={VMs in unhealthy state} which is derived from $S_i$; (iii) $A_i$=0 (no attack) or 1 (attack) which, for $VM_i$ is known under a deterministic approach; (iv) if $A_i$=0, then $S_i$ should be 1; (v) if $A_i$=1, then $S_i$ may be 0 or 1.

The fix signature identification algorithm, according to an embodiment of the present invention, for identifying critical fixes by VM differential ("diff") analysis (also called the "difference computation"), will now be set forth in the following paragraphs.

STEP ONE: Consider S=set of all $V_i$ where $A_i$=1 indicating attacked VMs. Separate S into $S_u$={set of all elements in S which are not healthy}, and $S_h$={attacked VMs which are healthy}.

STEP TWO: Pick one element $V_i$ of $S_u$, and one element $V_j$ of $S_h$, and compare their snapshot history starting from $d_{i1}$ and $d_{j1}$, respectively, and moving forward in time.

STEP THREE: If a non-NULL delta $d_{jk}$ is found on an element $V_3$ of $S_h$, then it is a candidate "patch" that leads to robustness. On the other hand, if a non-NULL delta $d_{i1}$ is found on an element $V_i$ of $S_u$, then it is not a candidate "patch" that leads to robustness.

STEP FOUR: Generalizing on step 3, the following may be done: (A) for every VM x in $S_h$, create Set $s_x$ of meaningful deltas (involves filtering of raw VM differencing results) that might have contributed to robustness; (i) compute set $P_h$=intersection of all $s_x$ sets (in some applications, a union operator may work better, but then a minimal set of changes may not be determined), (ii) for example, $s_i$={$d_{j3}$, $d_{j6}$}, $s_q$={$d_{q4}$, $d_{q6}$}: where $d_{j3}$==$d_{q4}$, but $d_{j6}$ not equal to $d_{q6}$, therefore under the intersection method, $P_h$={$d_{j3}/d_{q4}$} which is a single patch, and under the union method, $P_h$={$d_{j3}/d_{q4}$, $d_{j6}$, $d_{q6}$}, and (iii) $P_h$=union method may work better if a combination of patches P1 and P2 helped make one VM more robust, and P2 and P3 made another VM more robust; (B) for every VM y in $S_u$, create set $s_y$ of not useful deltas by computing set $P_u$=union of all $s_y$ (because it is desired to record all non-null deltas that did not help protect the VM against attack or workload spike); (C) the minimal set of non-null deltas that contribute to protecting the VM=$P_h$−$P_u$; and (D) the minimal set of root causes that contribute to VM instability=$P_u$−$P_h$.

Conclusion items are as follows: (i) if single patch always works, then $P_h$=intersection method, followed by $P_h$−$P_u$ will work; and (ii) if multiple patches are required sometimes, then $P_h$=union method is the final answer.

FACTORING IN THE PROBLEM-CAUSING SIGNATURE: In the previous fix signature algorithm, and for the sake of simplicity and of fully illustrating the full possible scope of the present invention, there was no attempt to factor in when a given delta value $d_{vn}$ occurred (in the delta members $d_{ab1}$ ... $d_{abp}$ of a pairwise delta set $DELTA_{ab}$) relative to when the problem-causing signatures were received and/or exhibited by the relevant VMs ($V_a$ or $V_b$). However, some embodiments may use this information to filter out $d_{vn}$'s from $f_{dvn}$ counts where the timing of the problem-causing signature, relative to the timing of the patch installation/uninstallation indicates that the patch installation/uninstallation would have been irrelevant to the continuing good health of the healthy $V_a$ of the pairwise pair.

OTHER FACTORS: as mentioned above, the fix signature algorithm set forth above is a relatively simple one. More complex algorithms according to the present invention may include consideration of other rules and/or factors, such as the following: (i) filtering of raw VM snapshot differencing to select "meaningful delta sets" (see definition of "meaningful delta sets, also referred to herein as "significant delta sets," below) corresponding to selected pairwise pairs; (ii) consideration and/or quantification of robustness; (iii) use of intersection of delta values common to all "meaningful delta sets; (iv) use of the foregoing intersection method to determine single patch solutions; (v) use of union of delta values found in any "meaningful delta set;" and/or (vi) use of the foregoing union method to determine multiple patch solutions.

Figure 8:
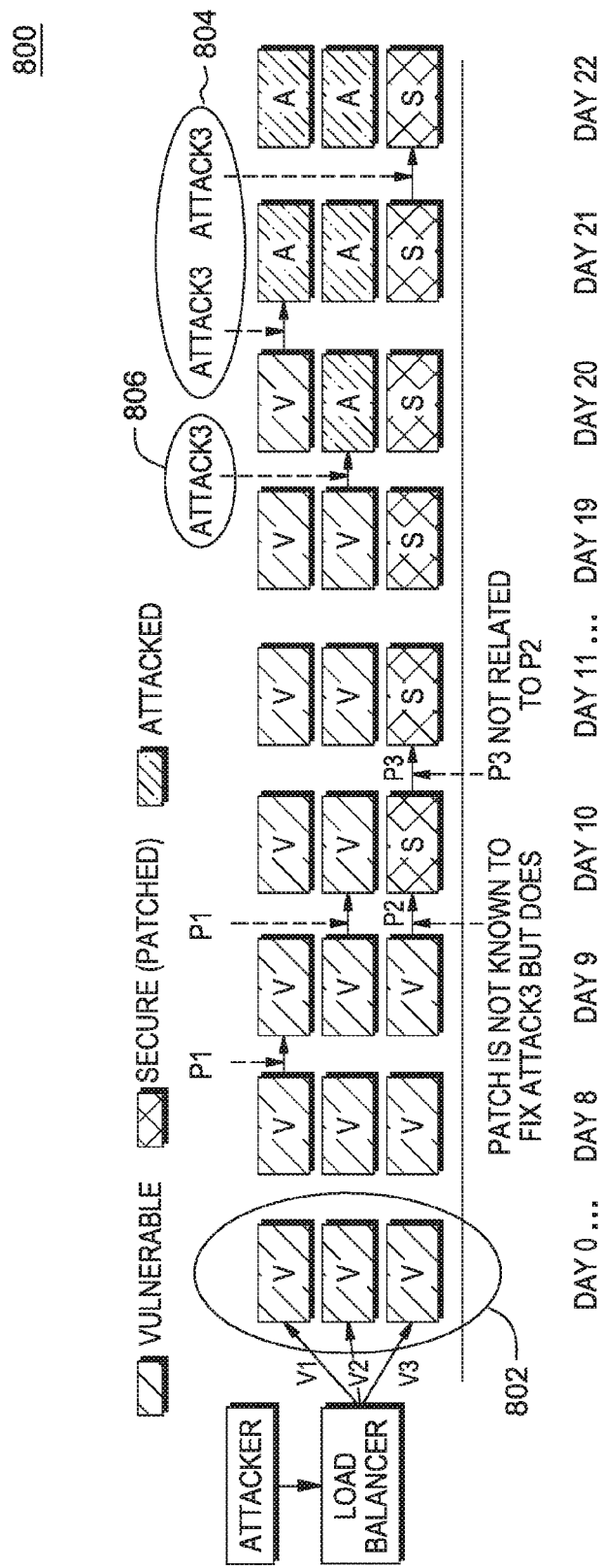
FIG. 8 is a virtual machine state transition diagram showing an application of an embodiment of the method according to the present invention.

An example of an application of the fix signature identification algorithm to an attack scenario will now be discussed with reference to diagram 800 of FIG. 8. As shown in FIG. 8, diagram 800 shows the status of a cluster 802 of three (3) virtual machines (V1, V2, V3), controlled by a common load balancer, over a period of 23 days. Patches, which each contain possible security fixes, are applied as follows: (i) patch P1 is applied to V1 at the end of day 8; (ii) patch P1 is applied to V2 at the end of day 9; (iii) patch P2 is applied to V3 at the end of day 9; and (iv) patch P3 is applied to V3 at the end of day 10. Attacks are made as follows: (i) attack3 806 is made on day 19 to V2 and is reported by a user (which results in enhanced logging); (ii) attack3 804 (detected by analysis of NW/FW (network/firmware) logs) is made on day 20 to V1 and on day 21 to V3. As can be seen from the cross-hatch coding of diagram 800: (i) V2 succumbs to attack3 806 on day 20; (i) V1 succumbs to attack3 804 on day 21; and (iii) V3 remains secure, despite attack3 804 made on day 21.

Certain useful information can be gleaned from snapshots revealing the pattern of diagram 800: (i) when V2 succumbs to attack3 806 on day 20, it is known that patch P1, previously applied to V2 on day 9, will not prevent attack3; and (ii) when V3 remains secure on day 22, it is known that patch P2 and/or P3, both of which were applied to V3 prior to its receipt of attack 3 on day 21, will be effective to counter attack3. However, in this example, it must be known that attack3 is the attack which has occurred (as opposed to some other attack). This can be accomplished through signature identification and attack detection.

A method applied to the above scenario can be expressed in set and/or mathematical notation as follows: (i) S={V1, V2, V3}, // all VMs; (ii) $S_h$={V3}// healthy VMs; (iii) $S_u$={V1, V2}// not healthy VMs; (iii) for each VM in $S_h$, compute $s_x$, set of meaningful deltas that may have contributed to robustness: $s_{V3}$={P2, P3}; (iv) meaningful delta identification (for example, P1, P2, P3) may also be used when practical and feasible; (v) for each VM x in $S_u$, compute $s_y$, set of deltas that did not contribute to robustness: $s_{V1}$={P1}; $s_{V2}$={P1}; (vi) $P_h$ (min. useful deltas) is intersection of all $s_x$ sets={P2, P3}; // union is an alternative option to find useful deltas; (vii) $P_u$ (not useful deltas) is union of all $s_{V1}$ sets={$^{P1}$}// union is only option to find not useful deltas; and (viii) candidate fix for problem=$P_h$-$P_u$={P2, P3}.

Figure 9:
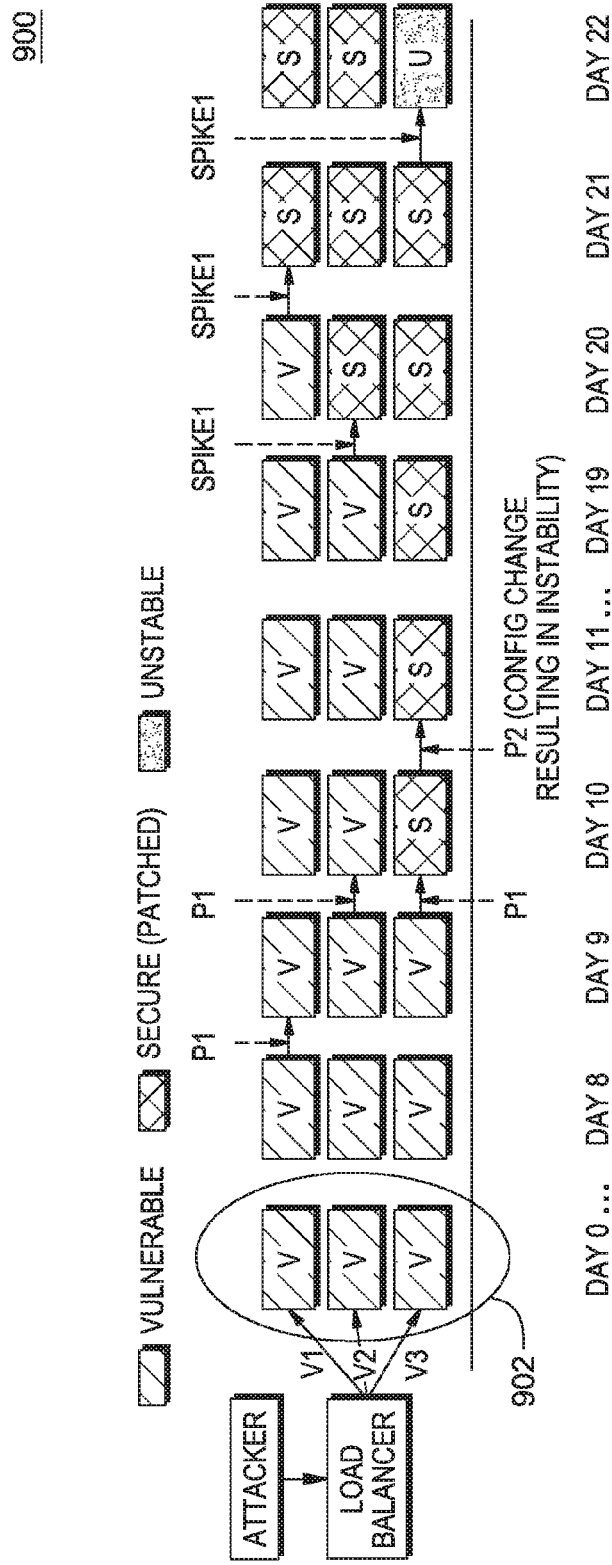
FIG. 9 is a virtual machine state transition diagram showing an application of an embodiment of the method according to the present invention.

An example of an application of the fix signature identification algorithm to a performance (that is, inherent VM stability) scenario will now be discussed with reference to diagram 900 of FIG. 9. As shown in FIG. 9, diagram 900 shows the status of a cluster 902 of three (3) virtual machines (V1, V2, V3), controlled by a common load balancer, over a period of 23 days. Patches (also known as "incidental upgrades"), which can consist of code updates which each contain possible fixes to prevent stability issues, or configuration changes intended to alter system behavior (ideally for the better) are applied as follows: (i) patch P1 is applied to V1 at the end of day 8; (ii) patch P1 is applied to V2 at the end of day 9; (iii) patch P1 is applied to V3 at the end of day 9; and (iv) Configuration change P2, resulting in an instability, is applied to V3 at the end of day 10. Workload spikes, which can cause system instability in vulnerable VMs, are observed to occur as follows: (i) V2 experiences a spike on day 19; (ii) V1 experiences a spike on day 20; and (iii) V3 experiences a spike on day 21. As can be seen from the cross-hatch coding of diagram 900, only V3 succumbs to instability caused by the spike.

In this example, because it is workload spikes which are being effectively countered, these workload spikes are determined by "workload signatures," as opposed to "attack signatures" detecting the attacks in the previous example of diagram 800 of FIG. 8. Such workload signatures can be determined by analyzing system and application logs in individual VMs.

Certain useful information can be gleaned from snapshots revealing the pattern of diagram 900 which shows that patch P1 will prevent instability so long as its salutary effect is not undone by patch P2 (as it was in V3, but not V1 or V2). This indicates that patch P2 probably needs to be: (i) undone in VMs that already have it; and (ii) fixed before any further VMs receive it in the future.

Algorithm applied to above scenario can be expressed in set and/or mathematical notation as follows: (i) S={V1, V2, V3}, // all VMs; (ii) $S_h$={V1, V2}// healthy VMs; (iii) $S_u$={V3}// not healthy VMs; (iv) for each VM in $S_h$, compute $s_x$, set of meaningful deltas that did not contribute to problem of $s_{V1}$={P1}; $s_{V2}$={P1}; (v) for each VM x in $S_u$, compute s_y, the set of deltas that may have contributed to problem of $s_{V3}$={P1, P2}; (vi) Pb (minimum useful deltas) is the intersection of all s_x sets={P1}// union is an alternative option to find useful deltas; (vii) $P_u$ (not useful deltas) is the union of all $s_y$ sets={P1, P2}// union is the only option to find not useful deltas; and (viii) in conclusion, root cause of problem=$P_u$-$P_h$={P2}.

The refinement of security policy, according to an embodiment of the present invention will now be discussed. In refining security policy it is helpful to know which VMs are known to be in the following "security categories": (i) compromised (vulnerable and attacked (or spiked)); (ii) uncompromised but vulnerable; and (iii) secure (not vulnerable). Attribute sets can be defined for each security category based upon the VMs that are determined to be in each security category. The machines in security categories (i) and (ii) can be helpful in capturing spatial aspects (for example, presence or absence of a file or contents within a file) and/or temporal aspects (for example, file modification within a time window) of the "state of insecurity" existing over the system of VMs. Some embodiments of the present invention: (i) derive a policy that captures the state of insecurity; and/or (ii) negate the derived policy to obtain security policy.

Some embodiments of the present invention may include one, or more, of the following features, characteristics and/or advantages: (i) a completely generic multi-VM difference analysis-based approach to identify the key differences that might explain why similar VMs in a group (e.g., cluster) are behaving differently, some in a faulty manner and others in a normal manner; (ii) uses knowledge of software components (for example, which applications or middleware or OS elements are installed in different directories, which are configuration files for the SW component versus log files, and so on) to help improve the accuracy of the diagnosis; (iii) analyzes the difference between similar servers (for example, servers in the form of virtual machines) to identify why some instances are well-behaved (for example, in terms of security, in terms of stability when operating under a workload spike); (iv) application-agnostic approach that uses a generic VM-level difference analysis technique; (v) compares well-behaved instances (at the VM level) to ill-behaved instances (at the VM level) among a group of similarly configured servers; (vi) generic and software component-agnostic; (vii) leverages the fact that many similarly configured servers (physical or virtual) operate in any large data center; (viii) exploits conventional efficient server check pointing (without VM snapshotting; (ix) exploits difference computation techniques; (x) builds an additional layer of intelligence by comparing the differences between periodically created checkpoints across a group of similar machines, in both temporal (going back in time) and spatial (comparing multiple similar VMs) dimensions; and/or (xi) characterizes each pairwise difference to come up with the identification of problematic changes made in the ill-behaved VMs in contrast to those not made in well-behaved VMs.

Some embodiments of the present invention may include one, or more, of the following features, characteristics and/or advantages: (i) diagnoses problems that manifest during steady-state operations; (ii) diagnoses problems that manifest as performance anomalies and/or security vulnerabilities (as opposed to installation failures); diagnoses a wide range of problems that stem from system state changes during steady-state operations; and/or (iii) a system and method based on capturing and analyzing system state changes (as opposed to events) to diagnose problems.

Some embodiments of the present invention recognize that "attacks" (see definition, below) may exploit vulnerabilities in the software of a physical, or virtual, machine, but attacks can often be prevented by upgrading versions of vulnerable software, or by updating the configuration (for example, disabling a browser plug-in). VM diff analysis according to some embodiments of the present invention can find such "state changes" made to some VMs in a similar group but not others, and tries to correlate such changes with whether they help or do not help such attacks on those VMs (and/or physical machines).

Some embodiments of the present invention may include one, or more, of the following features, characteristics and/or advantages: (i) uses state comparison/versioning technology to analyze impacts of changes and diagnose problems that otherwise require expertise; (ii) compares the snapshots of a system over a series of time points to infer which change contributes to a security breach or a security fix; (iii) does not require internal knowledge about the software in the system because of the use of state comparison as well as versioning structure to identify problems and fixes; (iv) computes differences between snapshot states and infers problems/fixes according to the snapshot states, differences, and the versioning structure of a large number of VMs in a production Cloud platform; (v) exploits inference, reasoning, and existence of a large number of VMs for identifying problems, fixes, and signatures; and/or (vi) in some embodiments, the existence of a large number of VMs is important as a basis for inference and reasoning drawn from the snapshots and snapshot differences.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Attack: any virus, worm or a rootkit, that enters the system (physical or virtual machine); some attacks are due to an ill-advised download by a user, or even by clicking on a malicious URL on the browser that hijacks the Web application and downloads a piece of malware on the system, and the latter form of these attacks generally depend on vulnerabilities in standard software such as the browser, the flash player, etc.

Significant delta (or meaningful delta): any delta which has not been predetermined to be irrelevant for purposes of physical machine and/or VM health.

What is claimed is:

1. A method comprising:
   monitoring a set of monitored virtual machines by (i) running the virtual machines to receive and process data, and (ii) intermittently taking snapshots of each virtual machine in the set of virtual machines;
   for each virtual machine of the set of monitored virtual machines, determining a set of snapshot deltas, with each snapshot delta respectively corresponding to changes between pairs of temporally adjacent snapshots;
   determining a first subset of virtual machines from the set of monitored virtual machines, where each virtual machine in the first subset of virtual machines meets the following conditions: (i) the virtual machine has been subject to an attack, and (ii) the virtual machine has not been adversely affected by the attack;
   determining a second subset of virtual machines from the set of virtual machines, where each virtual machine in the second subset of virtual machines meets the following conditions: (i) the virtual machine has been subject to an attack, and (ii) the virtual machine has been adversely affected by the attack; and
   analyzing the set(s) of snapshot deltas from the first subset of virtual machine(s) and/or the set(s) of snapshot deltas from the second subset of virtual machine(s) to determine at least one of the following: (i) unhealthy snapshot deltas that tend to occur in only virtual machines that are adversely affected by the attack, and/or (ii) healthy snapshot deltas that tend to occur only in machines that are subject to the attack but are not adversely affected by the attack;
   wherein:
   the comparison of the snapshot deltas is based only on significant snapshot deltas; and the analysis of the snapshot deltas includes:
  determining an identity of first union snapshot deltas that occur in at least one virtual machine of the first subset of machine(s), and
  communicating that the first union snapshot deltas may reflect an effective defense to the attack.

2. A method comprising:
monitoring a set of monitored virtual machines by (i) running the virtual machines to receive and process data, and (ii) intermittently taking snapshots of each virtual machine in the set of virtual machines;
for each virtual machine of the set of monitored virtual machines, determining a set of snapshot deltas, with each snapshot delta respectively corresponding to changes between pairs of temporally adjacent snapshots;
determining a first subset of virtual machines from the set of monitored virtual machines, where each virtual machine in the first subset of virtual machines meets the following conditions: (i) the virtual machine has been subject to an attack, and (ii) the virtual machine has not been adversely affected by the attack;
determining a second subset of virtual machines from the set of virtual machines, where each virtual machine in the second subset of virtual machines meets the following conditions: (i) the virtual machine has been subject to an attack, and (ii) the virtual machine has been adversely affected by the attack; and
analyzing the set(s) of snapshot deltas from the first subset of virtual machine(s) and/or the set(s) of snapshot deltas from the second subset of virtual machine(s) to determine at least one of the following: (i) unhealthy snapshot deltas that tend to occur in only virtual machines that are adversely affected by the attack, and/or (ii) healthy snapshot deltas that tend to occur only in machines that are subject to the attack but are not adversely affected by the attack;
wherein:
the comparison of the snapshot deltas is based only on significant snapshot deltas; and
the analysis of the snapshot deltas includes:
  determining an identity of second intersection snapshot deltas that occur in every virtual machine of the second subset of virtual machine(s), and
  communicating that the second intersection snapshot deltas are relatively likely to lead to a vulnerability to the attack.

3. A method comprising:
monitoring a set of monitored virtual machines by (i) running the virtual machines to receive and process data, and (ii) intermittently taking snapshots of each virtual machine in the set of virtual machines;
for each virtual machine of the set of monitored virtual machines, determining a set of snapshot deltas, with each snapshot delta respectively corresponding to changes between pairs of temporally adjacent snapshots;
determining a first subset of virtual machines from the set of monitored virtual machines, where each virtual machine in the first subset of virtual machines meets the following conditions: (i) the virtual machine has been subject to an attack, and (ii) the virtual machine has not been adversely affected by the attack;
determining a second subset of virtual machines from the set of virtual machines, where each virtual machine in the second subset of virtual machines meets the following conditions: (i) the virtual machine has been subject to an attack, and (ii) the virtual machine has been adversely affected by the attack; and
analyzing the set(s) of snapshot deltas from the first subset of virtual machine(s) and/or the set(s) of snapshot deltas from the second subset of virtual machine(s) to determine at least one of the following: (i) unhealthy snapshot deltas that tend to occur in only virtual machines that are adversely affected by the attack, and/or (ii) healthy snapshot deltas that tend to occur only in machines that are subject to the attack but are not adversely affected by the attack;
wherein:
the comparison of the snapshot deltas is based only on significant snapshot deltas; and
the analysis of the snapshot deltas includes:
  determining an identity of second union snapshot deltas that occur in at least one virtual machine of the second subset of virtual machine(s), and
  communicating that the second union snapshot deltas may cause a vulnerability to the attack.

4. A method comprising:
monitoring a set of monitored virtual machines by (i) running the virtual machines to receive and process data, and (ii) intermittently taking snapshots of each virtual machine in the set of virtual machines;
for each virtual machine of the set of monitored virtual machines, determining a set of snapshot deltas, with each snapshot delta respectively corresponding to changes between pairs of temporally adjacent snapshots;
determining a first subset of virtual machines from the set of monitored virtual machines, where each virtual machine in the first subset of virtual machines meets the following conditions: (i) the virtual machine has been subject to an attack, and (ii) the virtual machine has not been adversely affected by the attack;
determining a second subset of virtual machines from the set of virtual machines, where each virtual machine in the second subset of virtual machines meets the following conditions: (i) the virtual machine has been subject to an attack, and (ii) the virtual machine has been adversely affected by the attack; and
analyzing the set(s) of snapshot deltas from the first subset of virtual machine(s) and/or the set(s) of snapshot deltas from the second subset of virtual machine(s) to determine at least one of the following: (i) unhealthy snapshot deltas that tend to occur in only virtual machines that are adversely affected by the attack, and/or (ii) healthy snapshot deltas that tend to occur only in machines that are subject to the attack but are not adversely affected by the attack;
wherein:
identifying a fix based, at least in part, upon the determination of unhealthy snapshot deltas and/or healthy snapshot deltas; and
  applying the fix to at least one VM to: (i) prevent at least one vulnerability(ies), in the at least one VM, with respect to a malicious attack, and/or (ii) protect the at least one VM from failure due to a non-malicious workload spike.

5. A computer program product comprising a non-transitory computer readable storage medium having stored thereon:
first program instructions programmed to monitor a set of monitored virtual machines by (i) running the virtual machines to receive and process data, and (ii) intermittently taking snapshots of each virtual machine in the set of virtual machines;

second program instructions programmed to, for each virtual machine of the set of monitored virtual machines, determine a set of snapshot deltas, with each snapshot delta respectively corresponding to changes between pairs of temporally adjacent snapshots;

third program instructions programmed to determine a first subset of virtual machines from the set of monitored virtual machines, where each virtual machine in the first subset of virtual machines meets the following conditions: (i) the virtual machine has been subject to an attack, and (ii) the virtual machine has not been adversely affected by the attack;

fourth program instructions programmed to determine a second subset of virtual machines from the set of virtual machines, where each virtual machine in the second subset of virtual machines meets the following conditions: (i) the virtual machine has been subject to an attack, and (ii) the virtual machine has been adversely affected by the attack; and fifth program instructions programmed to analyze the set(s) of snapshot deltas from the first subset of virtual machine(s) and/or the set(s) of snapshot deltas from the second subset of virtual machine(s) to determine at least one of the following: (i) unhealthy snapshot deltas that tend to occur in only virtual machines that are adversely affected by the attack, and/or (ii) healthy snapshot deltas that tend to occur only in machines that are subject to the attack but are not adversely affected by the attack;

wherein:

the comparison of the snapshot deltas is based only on significant snapshot deltas; and the fifth program instructions are further programmed to:
determine an identity of first union snapshot deltas that occur in at least one virtual machine of the first subset of virtual machine(s), and
communicate that the first union snapshot deltas may reflect an effective defense to the attack.

6. A computer program product comprising a non-transitory computer readable storage medium having stored thereon:

first program instructions programmed to monitor a set of monitored virtual machines by (i) running the virtual machines to receive and process data, and (ii) intermittently taking snapshots of each virtual machine in the set of virtual machines;

second program instructions programmed to, for each virtual machine of the set of monitored virtual machines, determine a set of snapshot deltas, with each snapshot delta respectively corresponding to changes between pairs of temporally adjacent snapshots;

third program instructions programmed to determine a first subset of virtual machines from the set of monitored virtual machines, where each virtual machine in the first subset of virtual machines meets the following conditions: (i) the virtual machine has been subject to an attack, and (ii) the virtual machine has not been adversely affected by the attack;

fourth program instructions programmed to determine a second subset of virtual machines from the set of virtual machines, where each virtual machine in the second subset of virtual machines meets the following conditions: (i) the virtual machine has been subject to an attack, and (ii) the virtual machine has been adversely affected by the attack; and fifth program instructions programmed to analyze the set(s) of snapshot deltas from the first subset of virtual machine(s) and/or the set(s) of snapshot deltas from the second subset of virtual machine(s) to determine at least one of the following: (i) unhealthy snapshot deltas that tend to occur in only virtual machines that are adversely affected by the attack, and/or (ii) healthy snapshot deltas that tend to occur only in machines that are subject to the attack but are not adversely affected by the attack;

wherein:

the comparison of the snapshot deltas is based only on significant snapshot deltas; and the fifth program instructions are further programmed to:
determine an identity of second intersection snapshot deltas that occur in every virtual machine of the second subset of virtual machine(s), and
communicate that the second intersection snapshot deltas are relatively likely to lead to a vulnerability to the attack.

7. A computer program product comprising a non-transitory computer readable storage medium having stored thereon:

first program instructions programmed to monitor a set of monitored virtual machines by (i) running the virtual machines to receive and process data, and (ii) intermittently taking snapshots of each virtual machine in the set of virtual machines;

second program instructions programmed to, for each virtual machine of the set of monitored virtual machines, determine a set of snapshot deltas, with each snapshot delta respectively corresponding to changes between pairs of temporally adjacent snapshots;

third program instructions programmed to determine a first subset of virtual machines from the set of monitored virtual machines, where each virtual machine in the first subset of virtual machines meets the following conditions: (i) the virtual machine has been subject to an attack, and (ii) the virtual machine has not been adversely affected by the attack;

fourth program instructions programmed to determine a second subset of virtual machines from the set of virtual machines, where each virtual machine in the second subset of virtual machines meets the following conditions: (i) the virtual machine has been subject to an attack, and (ii) the virtual machine has been adversely affected by the attack; and fifth program instructions programmed to analyze the set(s) of snapshot deltas from the first subset of virtual machine(s) and/or the set(s) of snapshot deltas from the second subset of virtual machine(s) to determine at least one of the following: (i) unhealthy snapshot deltas that tend to occur in only virtual machines that are adversely affected by the attack, and/or (ii) healthy snapshot deltas that tend to occur only in machines that are subject to the attack but are not adversely affected by the attack;

wherein:

the comparison of the snapshot deltas is based only on significant snapshot deltas; and fifth program instructions are further programmed to:
determine an identity of second union snapshot deltas that occur in at least one virtual machine of the second subset of virtual machine(s), and communicate that the second union snapshot deltas may cause a vulnerability to the attack.

8. The computer program product of claim 5 further comprising:
- a processor(s) set structured, programmed and connected in data communication to execute program instructions stored on the non-transitory computer readable storage medium;
- wherein the computer program product is in the form of a computer system.

9. The computer program product of claim 6 further comprising:
- a processor(s) set structured, programmed and connected in data communication to execute program instructions stored on the non-transitory computer readable storage medium;
- wherein the computer program product is in the form of a computer system.

10. The computer program product of claim 7 further comprising:
- a processor(s) set structured, programmed and connected in data communication to execute program instructions stored on the non-transitory computer readable storage medium;
- wherein the computer program product is in the form of a computer system.

* * * * *